(12) United States Patent
Zhou et al.

(10) Patent No.: US 11,852,464 B2
(45) Date of Patent: Dec. 26, 2023

(54) CHROMATIC CONFOCAL SENSOR WITH IMAGING CAPABILITY FOR 6-AXIS SPATIAL ALLOCATION CALIBRATION

(71) Applicant: MLOptic Corp, Redmond, WA (US)

(72) Inventors: Wei Zhou, Sammamish, WA (US); Jiang He, Nanjing (CN); Siyuan Liang, Nanjing (CN)

(73) Assignee: MLOptic Corp., Redmond, WA (US)

(*) Notice: Subject to any disclaimer, the term of this patent is extended or adjusted under 35 U.S.C. 154(b) by 118 days.

(21) Appl. No.: 17/555,873

(22) Filed: Dec. 20, 2021

(65) Prior Publication Data

US 2023/0194252 A1    Jun. 22, 2023

(51) Int. Cl.
   *G01B 11/27*     (2006.01)
   *G02B 27/30*     (2006.01)

(52) U.S. Cl.
   CPC ............ *G01B 11/272* (2013.01); *G02B 27/30* (2013.01)

(58) Field of Classification Search
   CPC .................................................. G02B 27/30
   USPC ........................................................ 356/153
   See application file for complete search history.

(56) References Cited

U.S. PATENT DOCUMENTS

| | | | | |
|---|---|---|---|---|
| 4,821,114 A * | 4/1989 | Gebhardt | ........... | H04N 1/02835 358/509 |
| 2013/0314690 A1* | 11/2013 | Jones | .................... | G01B 11/007 359/615 |
| 2015/0228069 A1* | 8/2015 | Fresquet | ............ | G01N 21/9501 348/87 |
| 2016/0377995 A1* | 12/2016 | Fresquet | ............. | G03F 7/70733 355/74 |

FOREIGN PATENT DOCUMENTS

DE      102015121582 A1 *  6/2016  ........... G01B 11/002

* cited by examiner

*Primary Examiner* — Michelle M Iacoletti
*Assistant Examiner* — Omar H Nixon
(74) *Attorney, Agent, or Firm* — Tracy Jong Law Firm; Tracy P. Jong; Cheng Ning Jong

(57) ABSTRACT

A chromatic confocal sensor configured for calibrating an orientation of an equipment about the optical axis of the chromatic confocal sensor, wherein the equipment is disposed at a first orientation about the optical axis of the chromatic confocal sensor, the chromatic confocal sensor including a light source, a collimator, a lens and a reticle, wherein the light source, the collimator and the lens are coaxially disposed along the optical axis, the reticle is configured to be interposable between the collimator and the lens along the optical axis, an image is configured to be cast by the light source through the collimator, the reticle and the lens on the equipment, the image is disposed at a second orientation about the optical axis and the equipment is calibratable by aligning the equipment with the image such that the first orientation approaches the second orientation.

8 Claims, 6 Drawing Sheets

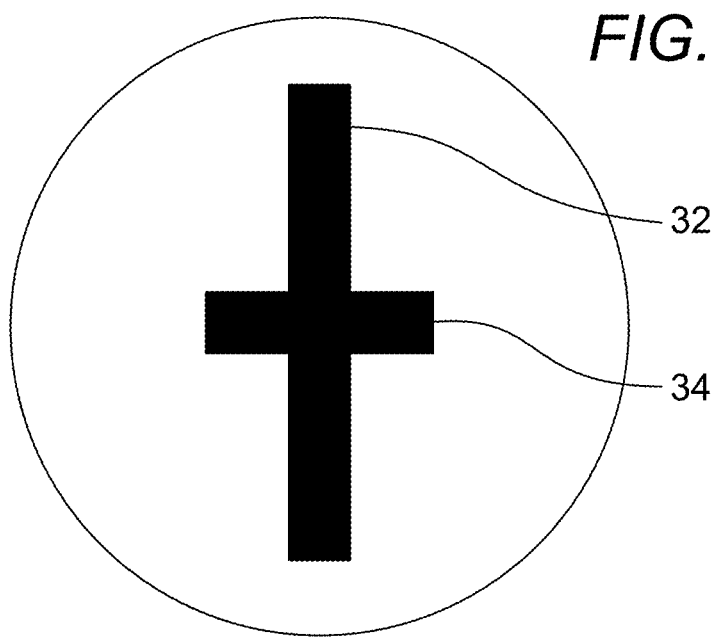

CHROMATIC CONFOCAL SENSOR WITH IMAGING CAPABILITY FOR 6-AXIS SPATIAL ALLOCATION CALIBRATION

BACKGROUND OF THE INVENTION

1. The Field of the Invention

The present invention relates to a chromatic confocal sensor with imaging capability for a 6-axis spatial allocation calibration practice. More specifically, the present invention is directed to a chromatic confocal sensor with imaging capability for an integrated optical metrology equipment with multiple optical functional modules where geometric relationships are sought.

2. Background Art

In one application, a chromatic confocal sensor is useful for measuring depth or distance in the Z-direction in any application with the Z-direction being a direction of the optical path of the sensor. Outputs of a chromatic confocal sensor can be used to produce positional measurements of an equipment based on a Z-direction measurements. For instance, a chromatic confocal sensor can be disposed at various X-Y positions in an X-Y-coordinate plane to obtain the Z-direction data, thereby extending its use to populate positional data of an equipment having its position measured in distances from an X-Y plane to result in positional data represented in an (X, Y, Z) coordinate system or orientation specified in angles of rotation about the X-axis, Y-axis and Z-axis, respectively. However a conventional chromatic confocal sensor is only capable of producing a three-dimensional location that can be specified with the (X, Y, Z) coordinate system and an orientation (or (RX, RY, RZ) where RX represents an angle about the X-axis or tip, RY represents an angle about the Y-axis or tilt and RZ represents an angle about the Z-axis or rotation) that is specified in rotations about only two out of the three axes of the base coordinates if the features of an equipment to be detected are symmetrical about the Z-axis, an axis co-axial with the optical axis of the chromatic confocal sensor. Therefore, in a conventional chromatic confocal sensor used in conjunction with, e.g., with an equipment having an entrance pupil aligned coaxially with the conventional chromatic confocal sensor, no RZ or rotation data would be available as the features of the entrance pupil or other features surrounding the entrance are symmetrical about the optical axis of the sensor.

There exists a need for a chromatic confocal sensor capable of providing an indication of all the rotational angles about all of the X, Y and Z-axes.

SUMMARY OF THE INVENTION

In accordance with the present invention, there is provided a chromatic confocal sensor configured for calibrating an orientation of an equipment about the optical axis of the chromatic confocal sensor, wherein the equipment is disposed at a first orientation about the optical axis of the chromatic confocal sensor, the chromatic confocal sensor including:
(a) a light source;
(b) a collimator;
(c) a lens; and
(d) a reticle, wherein the light source, the collimator and the lens are coaxially disposed along the optical axis, the reticle is configured to be interposable between the collimator and the lens along the optical axis, an image is configured to be cast by the light source through the collimator, the reticle and the lens on the equipment, the image is disposed at a second orientation about the optical axis and the equipment is calibratable by aligning the equipment with the image such that the first orientation approaches the second orientation.

In one embodiment, the reticle is configured to be removable from the optical axis. In one embodiment, the reticle is configured to be removable from the optical axis and the reticle is configured to be disposed on a wheel, wherein a first rotation of the wheel disposes the reticle along the optical axis and a second rotation of the wheel disposes the reticle away from the optical axis. In one embodiment, the reticle is a pair of orthogonally disposed cross-hairs. In one embodiment, the reticle is a pair of orthogonally disposed opaque cross-hairs on transparent background. In one embodiment, the reticle is a pair of orthogonally disposed transparent cross-hairs on opaque background. In one embodiment, the reticle is a pair of orthogonally disposed cross-hairs of different lengths. In one embodiment, the equipment is an optical imaging system with an external aperture and/or a rotational alignment requirement. In one embodiment, the chromatic confocal sensor further includes a wheel and the reticle is configured to be disposed on the wheel, the wheel is configured to be rotatable about a rotation axis, wherein the rotation axis is substantially parallel to the optical axis and a first rotation of the wheel disposes the reticle along the optical axis and a second rotation of the wheel disposes the reticle away from the optical axis.

An object of the present invention is to provide a tool capable of providing an indicator such that the orientation of an equipment about an optical axis of the tool can be obtained or indicated.

Another object of the present invention is to provide a chromatic confocal sensor capable of providing an indicator such that the orientation of an equipment about an optical axis of the tool can be obtained or indicated.

Another object of the present invention is to provide a tool capable of providing positional data and rotational data including an indication of rotational angles about all X, Y and Z-axes.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 is a diagram depicting yet another type of reticle and its effectiveness for use as an indicator for a target orientation.

PARTS LIST

2—chromatic confocal sensor
4—light source
6—collimator
8—reticle
10—objective lens
12—optical axis
14—first orientation
16—second orientation
18—cast image
20—equipment
22—spectrometer
24—wheel
26—reticle
28—opening
30—external aperture
32—cross hair
34—cross hair
36—collimation or conjugation image plane
38—emission port
40—central axis
42—lens Particular Advantages of the Invention The present chromatic confocal sensor includes an additional part, e.g., a reticle, which enables it to be used as an indicator when an image is cast through the additional part on a part of the equipment that is to be calibrated in its orientation about the optical axis of the present chromatic confocal sensor.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
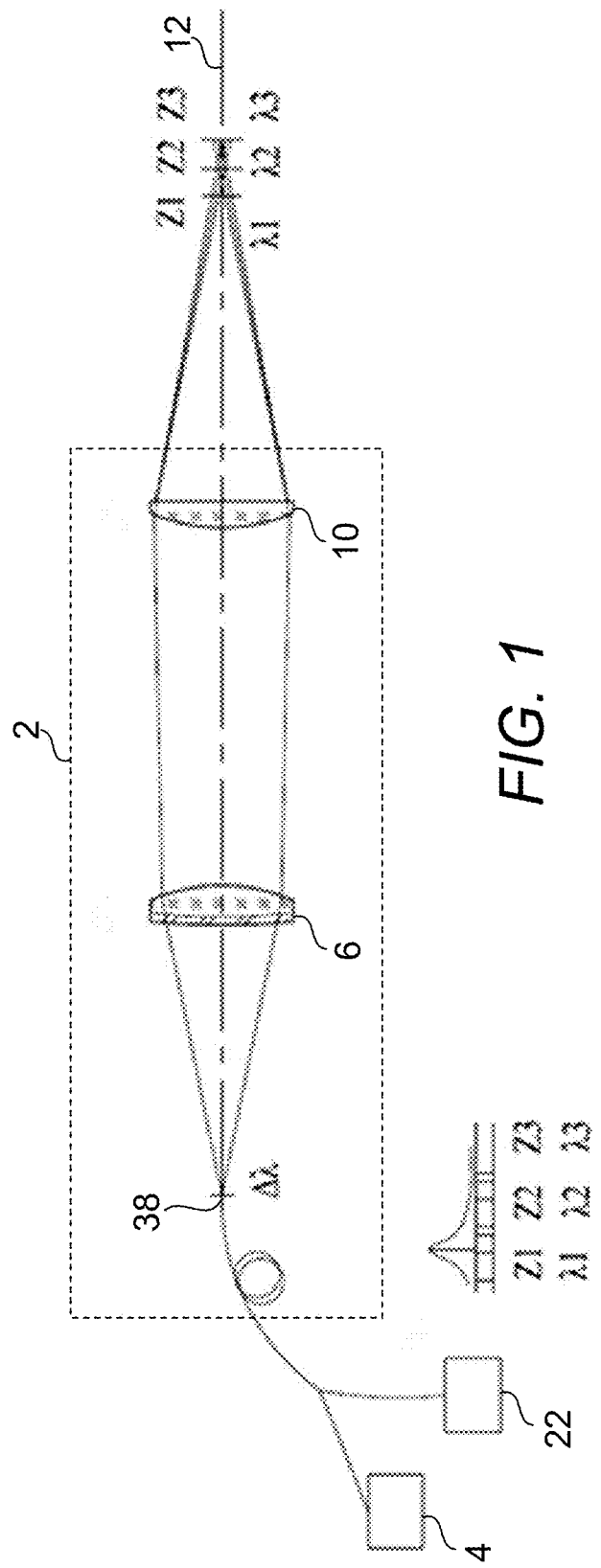
FIG. 1 is a diagram depicting a chromatic confocal sensor useful for providing displacement and distance measurements and their derivatives.

FIG. 1 is a diagram depicting a chromatic confocal sensor useful for providing displacement and distance measurements and their derivatives. A chromatic confocal sensor uses the imaging error, i.e., chromatic aberration of glass lenses for optical distance measurements. A white beam of light is sent from a light source through a special lens arrangement, e.g., the arrangement shown in FIG. 1. The light source 4 is not focused on a rainbow-colored line in the lens axis depending on the frequencies, e.g., $\lambda 1$, $\lambda 2$ and $\lambda 3$, etc. When light is reflected from an object, the color of the reflected light can be attributed to the distance between object and sensor. The reflected light is transmitted along the same path back to the spectrometer 22 to be analyzed. The relationship between a color and the distance between an object being measured and lens 10 has been configured in the controller for each sensor. This distance corresponds to a distance value.

Figure 2:
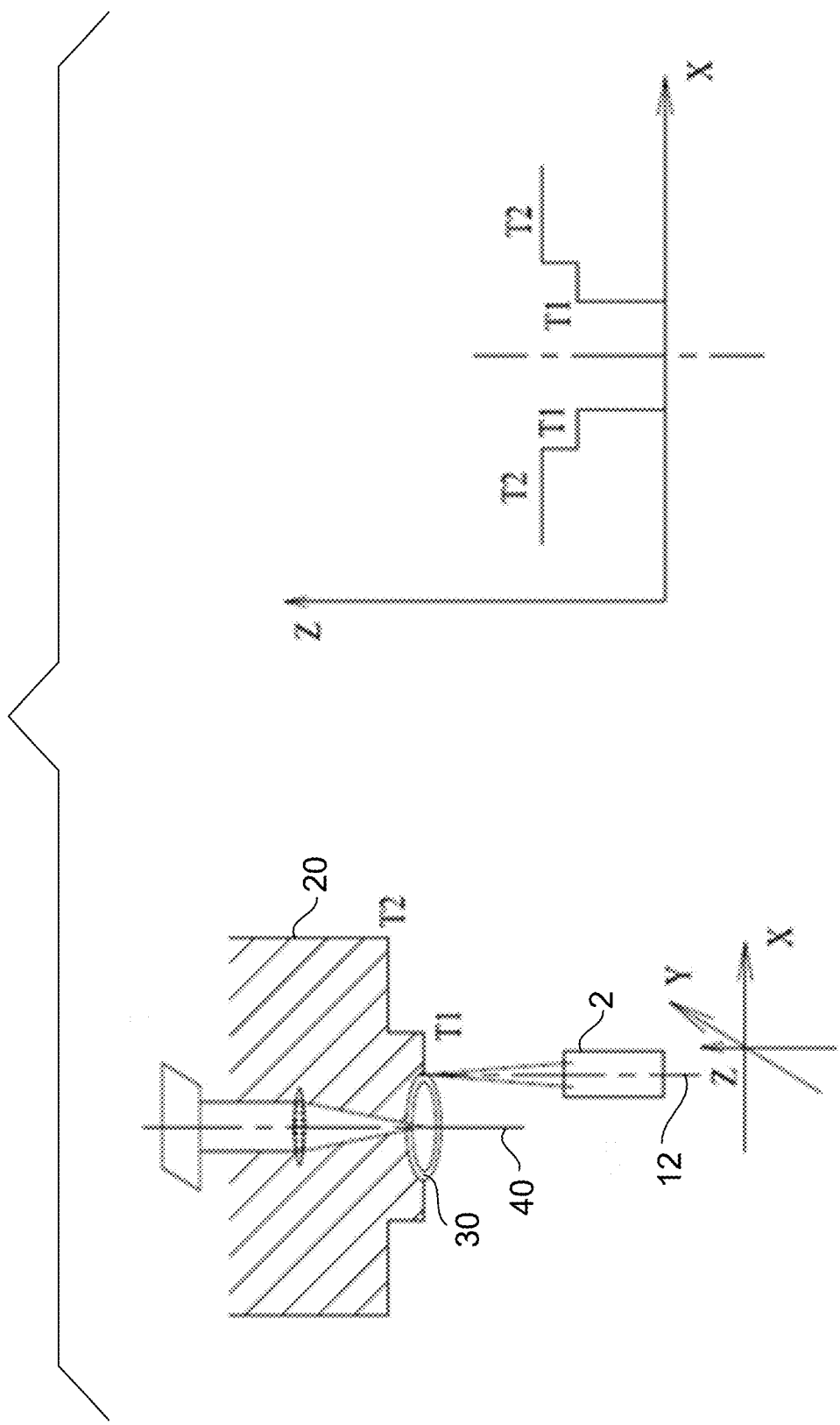
FIG. 2 is a diagram depicting a chromatic confocal sensor useful for providing the three-dimensional coordinates as well as the angles of rotation about the X and Y-axes only of the equipment being measured.

FIG. 2 is a diagram depicting a chromatic confocal sensor useful for providing the three-dimensional coordinates as well as the angles of rotation about the X and Y-axes only of the equipment 20 being measured. Here, the chromatic confocal sensor 2 is used for obtaining distance measurements of the surfaces of the equipment 20. It shall be noted that the Z values can be obtained for the various parts, e.g., T1 and T2 of the equipment as shown in the distance in the Z-direction for T1 and T2 points with respect to their spacings in the X-direction. As the equipment 20 is symmetrical in its construction about its central axis 40, the chromatic confocal sensor 2 is incapable of determining the orientation of the equipment about this central axis 40 or the angle of rotation with respect to the Z-axis.

Figure 3:
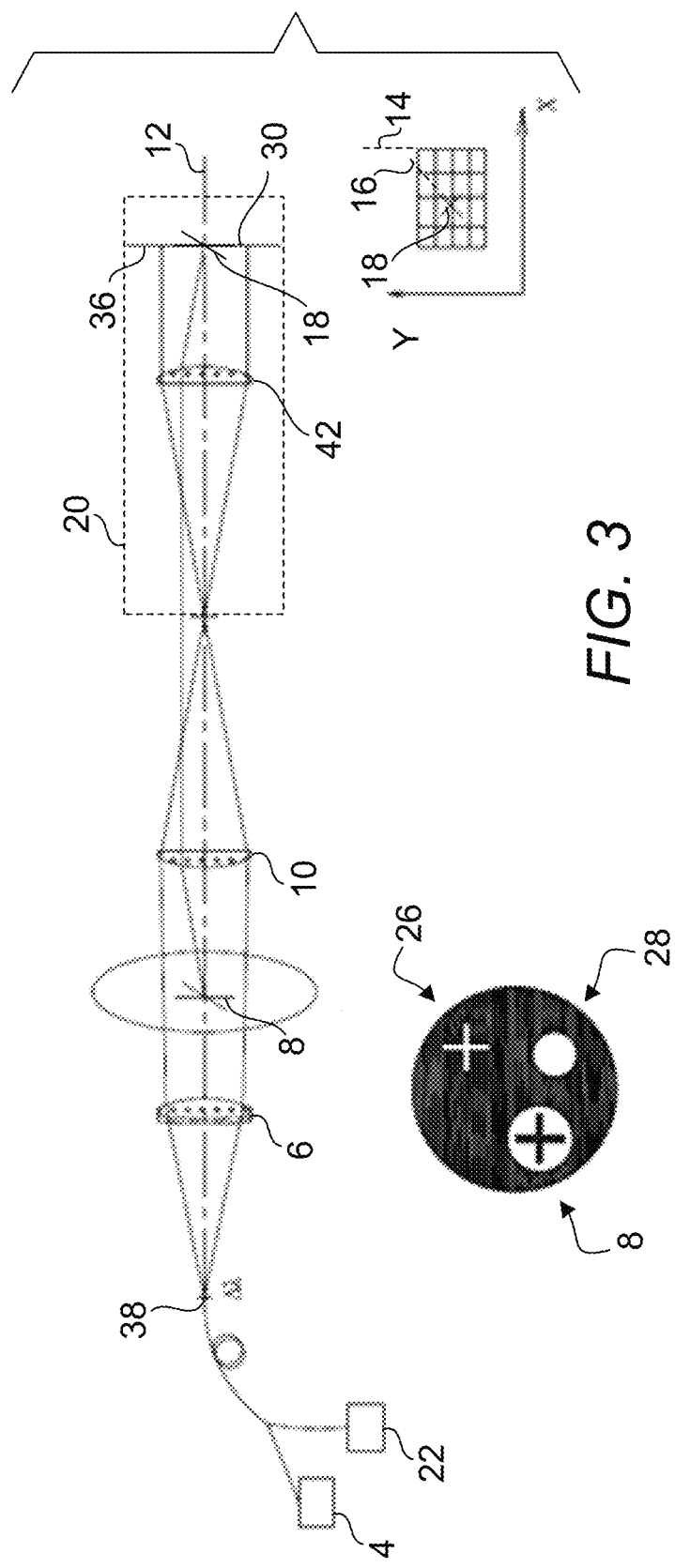
FIG. 3 is a diagram depicting a present chromatic confocal sensor useful for providing the three-dimensional coordinates as well as all of the angles of rotation about the X, Y and Z-axes of an equipment being measured.

FIG. 3 is a diagram depicting a present chromatic confocal sensor useful for providing the three-dimensional coordinates as well as all of the angles of rotation about the X, Y and Z-axes of an equipment 20 being measured. In one example, the equipment 20 is of an optical imaging system with an external aperture 30, e.g., entrance pupil. In another example, the equipment is an optical imaging system with a rotational alignment requirement. Disclosed herein is a chromatic confocal sensor 2 configured for calibrating an orientation of an equipment about the optical axis 12 of the chromatic confocal sensor, wherein the equipment 20 is disposed at a first orientation 14 about the optical axis of the chromatic confocal sensor. The chromatic confocal sensor includes a light source 4, a collimator 6, a lens 10 and a reticle 8. The collimator 6 is useful for ensuring the light source 4 is converted into a parallel beam. The reticle 8 is configured to be interposable between the collimator 6 and the lens 10 along the optical axis 12. The light source 4, the collimator 6 and the lens 10 are coaxially disposed along the optical axis 12. In use, an image 18 is configured to be cast by the light source 4 through the collimator 6, the reticle 8 and the lens 10 on the equipment 20, the image 18 is disposed at a second orientation 16 about the optical axis and the equipment 20 is calibratable by aligning the equipment with the image. Here, in aligning the equipment with respect to the reticle cast on the image plane 36, e.g., a part of the external aperture 30, the orientation of the equipment 20, i.e., the first orientation 14 can be adjusted such that it the equipment 20 is eventually orientated in a desired orientation, e.g., as it approaches the second orientation 16.

It shall be noted that an image 18 of the reticle 8 is required to be successfully cast on a surface in order for the image to be detected. Here, the optics that deal with the propagation of light beyond the chromatic confocal sensor is now important to cast the image 18 as an image detectable with an instrument, e.g., the same spectrometer 22 useful for detecting the reflected and aberrated light through the chromatic confocal sensor. Here, the optics may include a lens or collimator 42 which collimates the incoming incident on lens 42. In use, an image similar to the lower right drawing of FIG. 3 can be obtained via spectrometer 22. This drawing shows a grid which represents a grid superimposed on the cast image 18. Here, any one of the vertical lines can be treated as a line representing a first orientation 14 and the cast image 18 represents the target orientation to which the orientation of the equipment 20 is to be adjusted. Here, a cross-hair of the reticle can be treated as this target orientation. The reticle 8 is preferably used only when the orientation about the optical axis or Z-axis of the equipment is desired as the reticle 8 or the cross-hairs can block some rays and negatively impact the use of the chromatic confocal sensor for detecting and resolving distance measurements outside of its use for detecting the orientation of the equipment with respect to the optical axis 12. The reticle 8 may be left interposed between the collimator 6 and lens 10 if the precision of distance measurements obtained through the chromatic confocal sensor is not critical or not necessary. However, for the chromatic confocal sensor to be readily useful for all purposes of its construction, the reticle 8 can be made to be removable when it is no longer needed. The lower left drawing of FIG. 3 depicts two reticles 8, 26 and an opening 28, all of which are disposed on a wheel 24 where the three features 8, 26, 28 are disposed about a rotational axis and all of the features are disposed equidistant to the rotational axis. Reticle 8 is essentially made of two orthogonally disposed opaque cross-hairs disposed on a transparent backing material, e.g., glass or simply the two orthogonally disposed opaque cross-hairs without a supporting backing or the background is voided. Reticle 26 is made of two transparent orthogonally disposed cross-hairs disposed on a transparent backing material, e.g., glass or simply an opaque plate that includes cross-hairs-shaped void which allows transmission of light. In the embodiment shown, the reticle 18 is configured to be removable from the optical axis by disposing a reticle 8, 26 on the wheel 24. In this embodiment, a reticle 8, 26 is configured to be removable from the optical axis when the reticle is not desired or necessary to be disposed along the optical axis, for instance, when other measurements are taken to allow the maximum amount of light to pass through the lens 10. The wheel 24 is configured to be rotatable about an axis that is substantially parallel to the optical axis 12 such that the reticle is disposed orthogonally with respect to the parallel beam that is a result of the light source and the collimator. In selecting a reticle 8, 26 for use in calibrating the orientation of an equipment 20 about the optical axis 12 or the Z-axis, the wheel 24 is simply rotated until the desired feature is optically interposed between the collimator 6 and the lens 10 along the optical axis 12. The wheel 24 is again rotated to move a reticle away from this position when it is no longer needed. The opening 28 is provided to allow unobstructed light rays through the wheel 24 when a reticle 8, 26 is no longer needed.

Figure 4:
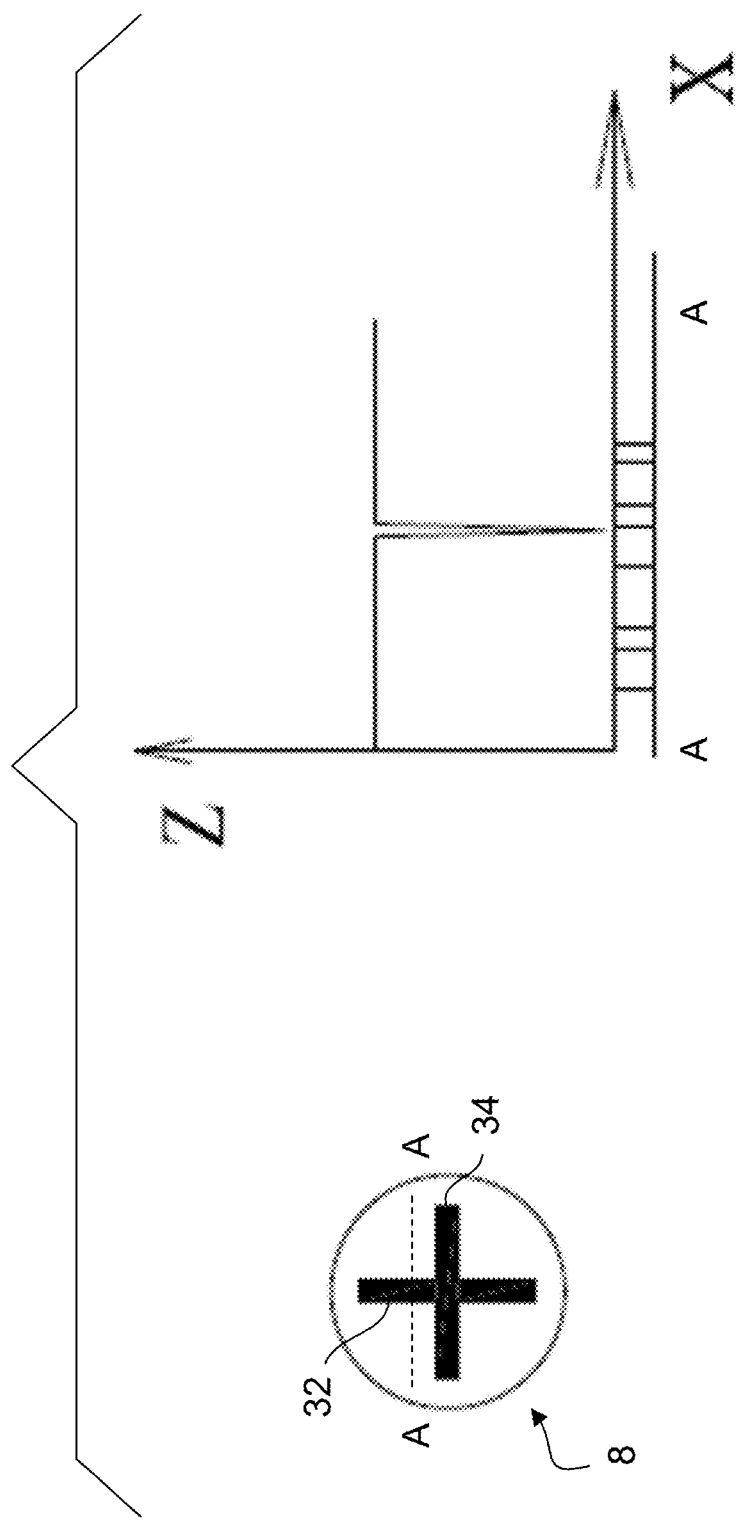
FIG. 4 is a diagram depicting a type of reticle and its effectiveness for use as an indicator for a target orientation.
Figure 5:
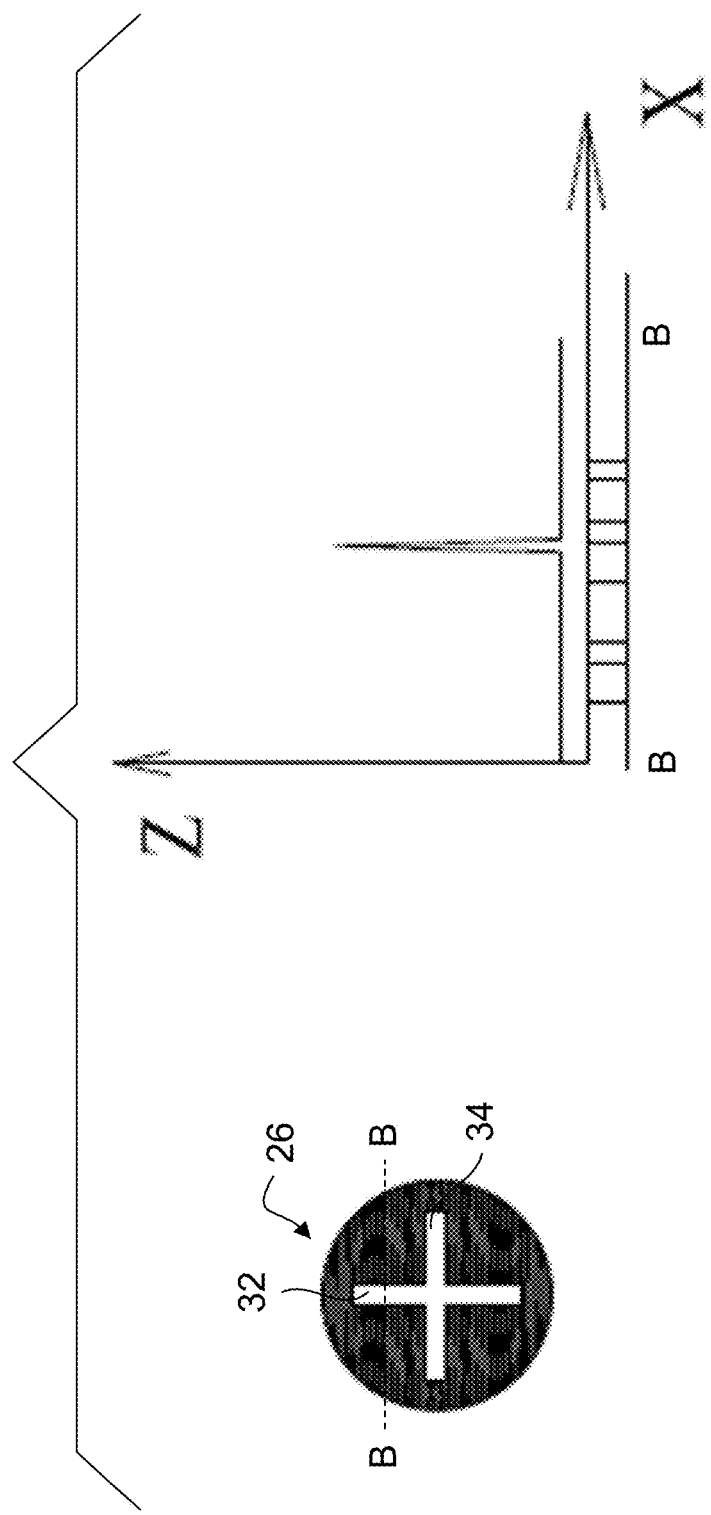
FIG. 5 is a diagram depicting a type of reticle and its effectiveness for use as an indicator for a target orientation.

FIGS. 4, 5 and 6 are diagrams depicting various types of reticle and their effectiveness for use as an indicator for a target orientation. Referring to FIG. 4, the reticle 8 is shown on the left and a sample returned light signal across line A-A for such a reticle 8 is provided on the right. Areas of light transmission correspond to the portions of the light level detection plot that are level. Here, the "signal" is essentially the dip in the plot where light transmission is obscured by a part of the vertically disposed crosshair. Referring to FIG. 5, the reticle 26 is shown on the left and a sample returned light signal across line B-B for such a reticle 26 is provided on the right. Areas where light transmission do not occur correspond to the portions of the light level detection plot that are level. Here, the "signal" is essentially the "spike" in the plot where light transmission occurs through the vertically disposed crosshair that is voided. It shall be noted that compared to one another, the signal-to-noise ratio for the latter is higher and therefore the reticle shown in FIG. 5 may provide a clearer indicator as a guide for which an equipment's orientation is adjusted if the opaque background does not present itself as a barrier to the adjustment effort. FIG. 6 discloses a reticle having orthogonally-disposed crosshairs that are not of equal length. It shall be noted that vertically-disposed cross-hair 32 is longer than horizontally-disposed cross-hair 34. As the two are of different lengths, this can further aid a user in distinguishing the orientation of the reticle itself when used as a target for adjustment of the orientation of an equipment as there will be no confusion as to which cross-hair represents a previously established orientation, e.g., vertical or horizontal.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A chromatic confocal sensor configured for calibrating an orientation of an equipment about the optical axis of said chromatic confocal sensor, wherein the equipment is disposed at a first orientation about the optical axis of said chromatic confocal sensor, said chromatic confocal sensor comprising:
    (a) a light source;
    (b) a collimator;
    (c) a lens; and
    (d) a reticle,
    wherein said light source, said collimator and said lens are coaxially disposed along the optical axis, said reticle is configured to be interposable between said collimator and said lens along the optical axis, an image is configured to be cast by said light source through said collimator, said reticle and said lens on the equipment, said image is disposed at a second orientation about the optical axis, the equipment is calibratable by aligning the equipment with said image such that said first orientation approaches said second orientation and said reticle is configured to be removable from the optical axis.

2. The chromatic confocal sensor of claim 1, wherein said reticle is configured to be disposed on a wheel, wherein a first rotation of the wheel disposes said reticle along the optical axis and a second rotation of the wheel disposes said reticle away from the optical axis.

3. The chromatic confocal sensor of claim 1, wherein said reticle is a pair of orthogonally disposed cross-hairs.

4. The chromatic confocal sensor of claim 1, wherein said reticle is a pair of orthogonally disposed opaque cross-hairs on transparent background.

5. The chromatic confocal sensor of claim 1, wherein said reticle is a pair of orthogonally disposed transparent cross-hairs on opaque background.

6. The chromatic confocal sensor of claim 1, wherein said reticle is a pair of orthogonally disposed cross-hairs of different lengths.

7. The chromatic confocal sensor of claim 1, wherein the equipment is an equipment selected from the group consisting of an optical imaging system with an external aperture, an optical imaging system with a rotational alignment requirement and a combination thereof.

8. The chromatic confocal sensor of claim 1, further comprising a wheel and said reticle is configured to be disposed on said wheel, said wheel is configured to be rotatable about a rotation axis, wherein said rotation axis is substantially parallel to the optical axis and a first rotation of said wheel disposes said reticle along the optical axis and a second rotation of said wheel disposes said reticle away from the optical axis.

* * * * *